(No Model.)
R. RUFFIN.
TIRE TIGHTENER.
No. 309,164. Patented Dec. 9, 1884.
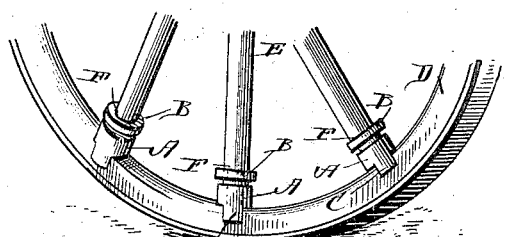
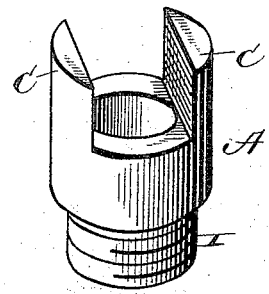
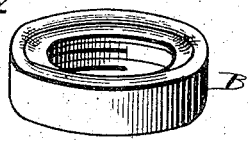
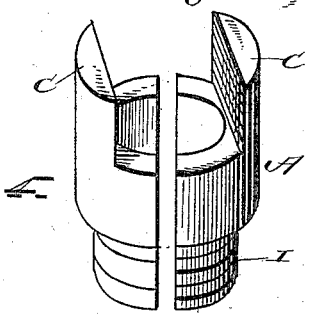
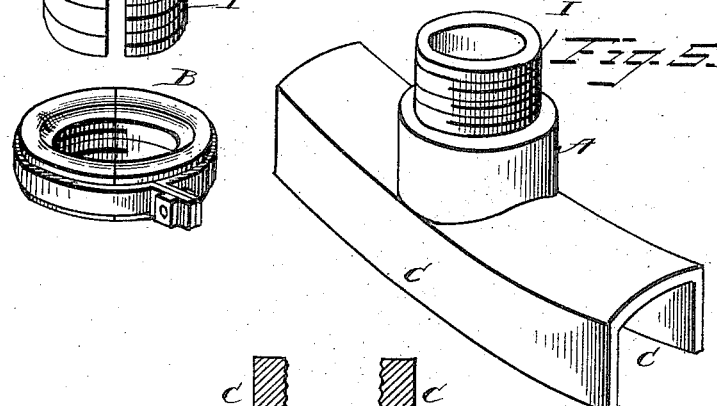
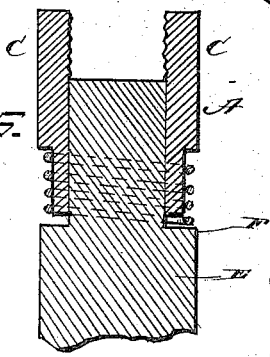
WITNESSES
Robt Ruffin
INVENTOR
by
Attorneys

UNITED STATES PATENT OFFICE.

ROBERT RUFFIN, OF COMO, MISSISSIPPI, ASSIGNOR OF ONE-HALF TO WILLIAM RUFFIN, OF SAME PLACE.

TIRE-TIGHTENER.

SPECIFICATION forming part of Letters Patent No. 309,164, dated December 9, 1884.

Application filed April 30, 1884. (No model.)

*To all whom it may concern:*

Be it known that I, ROBERT RUFFIN, a citizen of the United States, residing at Como, in the county of Panola and State of Mississippi, have invented a new and useful Tire, Spoke, and Felly Tightener, of which the following is a specification, reference being had to the accompanying drawings.

The objects of this invention are to tighten the tires, spokes, and fellies of wheels without cutting, shrinking, or wedging the tire, for carriages, wagons, velocipedes, wheelbarrows—in fact, for all wheels in which the tires, spokes, and fellies may be kept tight; and to these ends the invention consists in the construction and novel arrangement of parts of the tightener, as will be hereinafter fully described, and particularly pointed out in the claim.

Figure 1 is a view in perspective of a wheel with my improved tightening device applied. Fig. 2 is a view in perspective of the inner cylinder and integral clamps. Fig. 3 is a view of the outer cylinder or nut. Fig. 4 is a perspective view of a modification, showing the inner cylinder made sectional, and the outer cylinder also made sectional and secured by a ring-clamp to the other cylinder. Fig. 5 is a perspective view of a modification, showing the clamps extending entirely around and under the felly, forming, virtually, an inner tire; and Fig. 6 is another modification, in sectional view, showing a spring in the hollow cylinder in place of threads.

Referring by letter to the accompanying drawings, A designates the inner cylinder, which is used when the wheel is being constructed, in connection with the outside cylinder or nut, B, which is threaded internally and screws up and down on the external threads, I, on the end of the cylinder A. This cylinder A is provided with integral clamps C C on one end, which receive and clamp the sides of the felly D at the ends of the spokes. The spokes E are provided each with a shoulder, F, against which the nut B or outer cylinder bears. The tightener is put in place on the spoke before the felly is put on, and the tire is then put on in the usual manner. The tightener may be made of any kind of metal that will expand and contract with the tire under heat and cold. In warm weather—*i. e.*, hot dry weather—the metal expands and the wood shrinks. To overcome the shrinkage in the latter, the cylinders may be lengthened by turning the nut B, which rests against the shoulder F, to force cylinder A toward the felly. In cold wet weather the wood swells and the metal contracts. To prevent "dishing" or "cupping" of the wheels, the reverse operation of the cylinders would be necessary—*i. e.*, the nut B should be turned on the thread in a direction to draw the cylinder A toward the nut. The clamp subserves the double purpose of preventing the felly from splitting and acting as a stay to the inner cylinder (which moves freely up and down) in tightening and loosening the same. The outer end of the spoke passes through the entire cylinder and into the felly, the clamp end of the cylinder supporting the felly.

For tightening the tires, spokes, and fellies of wheels after they have been made, (without this tightener,) the cylinders may be put around the spokes by cutting them (the cylinders) vertically into two sections, (see Fig. 4,) and placing the two sections of the inner cylinder around the spoke immediately at the felly, as before described, and screwing the two sections of the nut or lower cylinder (held together by a clamp or set-screws) around the lower threaded end of the sectional cylinder A; or I may construct the clamp as shown in Fig. 5, in which it is extended entirely under and around the felly, forming practically an inner tire, or as in Fig. 6, where a spring is employed in lieu of the threads; or I may use a spring in connection with the threads.

The utility of this device is obvious, and its advantages will be readily suggested from the foregoing description, to which I will add that the inner faces of the clamps are serrated, so that they will grip the sides of the felly.

I am aware that a tire-tightener has been constructed prior to my invention in which a tenon-sleeve externally threaded from end to end and flush with the spoke at the shoulder of the tenon, upon which it is driven and rigidly secured, has been used in connection with a separate felly-socket perforated for the passage of said tenon, and having side flanges to prevent turning, and a tightening-nut working on the screw-sleeve against the base of the felly-socket, and I disclaim said construction.

I am further aware that a construction wherein the ends of the spokes pass through plates formed with annular flanges around the openings through which the ends of the spokes pass, said annular flanges fitting tightly into the openings of the fellies, have had lips which embraced the sides, and the upper ends of the sleeves pressed against the under sides of the plates; and I also disclaim this construction.

Having thus fully described my invention, what I claim as new, and desire to secure by Letters Patent of the United States, is—

The combination, with the spokes, felly, and tire, of the hollow cylinder A, recessed or slotted at one end to provide the integral clamps C C, which fit around the felly, the threads I on its opposite shouldered end, and the cylindrical nut B, working on the threaded end of the cylinder A against the shoulder, as set forth.

In testimony that I claim the foregoing as my own I have hereto affixed my signature in presence of two witnesses.

ROBERT RUFFIN.

Witnesses:
WILLIAM RUFFIN,
PANOLA E. DAVIS.